United States Patent
Vassard et al.

(10) Patent No.: US 7,668,617 B2
(45) Date of Patent: *Feb. 23, 2010

(54) METHOD OF CALIBRATING AN OPHTHALMIC-LENS-PIERCING MACHINE, DEVICE USED TO IMPLEMENT ONE SUCH METHOD AND OPHTHALMIC-LENS-MACHINING APPARATUS COMPRISING ONE SUCH DEVICE

(75) Inventors: Michaël Vassard, Boos (FR); Jean-Jacques Videcoq, Pavilly (FR)

(73) Assignee: Briot International, Pont de l'Arche (FR)

( * ) Notice: Subject to any disclaimer, the term of this patent is extended or adjusted under 35 U.S.C. 154(b) by 364 days.

This patent is subject to a terminal disclaimer.

(21) Appl. No.: 10/574,980

(22) PCT Filed: Sep. 6, 2004

(86) PCT No.: PCT/FR2004/002260

§ 371 (c)(1),
(2), (4) Date: Apr. 7, 2006

(87) PCT Pub. No.: WO2005/036286

PCT Pub. Date: Apr. 21, 2005

(65) Prior Publication Data

US 2007/0062271 A1    Mar. 22, 2007

(30) Foreign Application Priority Data

Oct. 10, 2003  (FR)  .................................. 03 11913

(51) Int. Cl.
G06F 19/00 (2006.01)
G01D 18/00 (2006.01)
G01D 21/00 (2006.01)
B24B 49/00 (2006.01)
B24B 7/19 (2006.01)
G01B 1/00 (2006.01)
G01M 19/00 (2006.01)
G01P 21/00 (2006.01)
G01C 17/38 (2006.01)

(52) U.S. Cl. .................. 700/186; 700/160; 700/164; 700/159; 700/190; 700/173; 702/85; 702/86; 702/87; 702/88; 702/95; 451/5; 451/6; 451/41; 33/502; 33/507

(58) Field of Classification Search ............. 702/85–95; 700/160, 164, 159, 186, 190, 173; 451/5, 451/6, 41

See application file for complete search history.

(56) References Cited

U.S. PATENT DOCUMENTS 5,304,773 A * 4/1994 Kilian et al. ........... 219/121.78

(Continued)

*Primary Examiner*—Albert DeCady
*Assistant Examiner*—Sunray R Chang
(74) *Attorney, Agent, or Firm*—Wenderoth, Lind & Ponack, L.L.P.

(57) ABSTRACT

The invention relates to a method of calibrating an ophthalmic-lens-piercing machine, a device used to implement one such method and a ophthalmic-lens-machining apparatus comprising one such device. The inventive method applies to a machine including a piercing tool, a lens support which is associated with a first reference mark ($O^1, X^1, Y^1$), and programmable tool-control means which are associated with a second reference mark expressing set co-ordinates which define a target piercing point (M). A template is placed on the support, and the template includes pre-applied markings defining a third reference mark ($O^3, X^3, Y^3$), such that the third reference mark in essentially in line with the first reference mark. The template is pierced at a pre-determined point corresponding to a target point, and an image of the template this point position, and a correction is applied to the set co-ordinates that can compensate for the misalignment. A device is also provided which is used to implement the method, and to an ophthalmic-lens-machining apparatus including one such device.

9 Claims, 3 Drawing Sheets

U.S. PATENT DOCUMENTS

| | | | |
|---|---|---|---|
| 5,497,234 A * | 3/1996 | Haga | 356/613 |
| 5,806,198 A * | 9/1998 | Guillermin | 33/502 |
| 6,327,790 B1 * | 12/2001 | Sillon | 33/562 |
| 6,480,757 B1 * | 11/2002 | Susnjara | 700/159 |
| 7,191,030 B2 * | 3/2007 | Videcoq | 700/164 |
| 2001/0016786 A1 * | 8/2001 | Takahashi et al. | 700/195 |

* cited by examiner

US 7,668,617 B2

METHOD OF CALIBRATING AN OPHTHALMIC-LENS-PIERCING MACHINE, DEVICE USED TO IMPLEMENT ONE SUCH METHOD AND OPHTHALMIC-LENS-MACHINING APPARATUS COMPRISING ONE SUCH DEVICE

BACKGROUND OF THE INVENTION

The present invention relates to a method for calibrating an ophthalmic lens drilling machine, the machine including a drilling tool; an ophthalmic lens support associated with a first coordinate system; and a programmable tool guidance means associated with a second coordinate system expressing command coordinates which define a target drilling point. In the method the following successive steps are carried out. A template is placed on the support, the template having pre-applied markings defining a third coordinate system related to the template, such that the third coordinate system is made to substantially coincide with the first coordinate system. The template is drilled in at least one predetermined point corresponding to a target point defined by predetermined command coordinates, such that a real drilling point is obtained.

FIG. 1 shows schematically an ophthalmic lens drilling machine of a known type, which essentially comprises a support 2 on which a lens can be mounted and fixed for grinding, a drilling tool 3 which can be moved in a controlled way with respect to the support 2, and means 11 for guiding the tool 3.

The support 2 is shown schematically in the form of a receptacle enabling ophthalmic lenses of different shapes to be fixed with respect to the frame, in a fixed coordinate system $O_1$, $X_1$, $Y_1$ associated with the support 2. The support 2 is provided to hold the ophthalmic lens in a support plane which is assumed to be horizontal. The reference axes $X_1$, $Y_1$ are therefore assumed to be horizontal.

The support 2 which is shown is a receptacle having an internal shape complementary to that of an adapter, of the type conventionally used to fix the lens on the movable arm of a grinder. An adapter of this kind is fixed, by gluing for example, to one of the faces of the lens. The receptacle 2, which is intended to receive an adapter of this type by insertion, has an indexing shape 2A complementary to an indexing shape of the adapter, which enables the lens to be orientated on the support 2, and thus with respect to the frame of the machine 1. The indexing means 2A thus define the orientation of the support 2 and of the frame of the machine, in other words the coordinate system $O_1$, $X_1$, $Y_1$.

The drilling tool 3 is defined as being a tool which removes material around an axis, assumed in this case to be vertical (orthogonal to the axes $X_1$, $Y_1$), in the thickness direction of the lens, over a virtually point-like region of the lens or one having an area much smaller than the area of the lens. The term "drilling" can denote a conventional operation of drilling with a drill bit, resulting in the formation of a hole with a substantially circular cross section, or else an operation of "notching", resulting in the formation of a notch in the edge of the lens, or any other type of more complex milling.

The guidance unit 11 for guiding the tool 3 are provided to move the tool 3 according to a machining task to be carried out on a lens placed in the machine. For this purpose, these guidance unit 11 comprise driver 13 adapted to move the tool 3, and controller 15 for controlling the driver 13, adapted to deliver to the driver 13 a command signal C corresponding to the machining task to be performed. The controller 15 is programmable means; it is provided to store a certain number of control laws with parameters set according to the shape and position of the drilling to be carried out. Thus the sequence of movements and operations executed by the tool 3, defined by the command signal C, is a function of the shape and position parameters supplied to the input of the controller 15. These parameters are indicated in FIG. 1 by the reference F (shape parameters) and by the references X, Y (position parameters). The position parameters X, Y are expressed in the second frame reference associated with the guidance unit 11, this virtual coordinate system theoretically coinciding with the first coordinate system $O_1$, $X_1$, $Y_1$ related to the support 2.

FIG. 2 shows an ophthalmic lens 21 of generally rectangular shape, having a center marking $O_3$ and axis markings $X_3$, $Y_3$ on one of its faces.

The center $O_3$ represents the optical center of the lens 21, and the axis $X_3$ represents its optical axis. The purpose of the marking of the axis $Y_3$, perpendicular to the axis $X_3$ in the general plane of the lens 21, is essentially to define the optical center $O_3$ at its intersection with the axis $X_3$.

When an adapter is centered on an ophthalmic lens blank for grinding, the center of the adapter coincides with the optical center $O_3$ of the blank.

Thus, after the grinding operation which results in the production of the lens 21 in its finished form, when the lens 21 with its grinding adapter is placed on the support 2 for drilling in the machine 1, the center of the support $O_1$ theoretically coincides with the optical center $O_3$ located by the axis markings $X_3$, $Y_3$ on the leans 21.

If a hole is then to be drilled in the lens 21 with the drilling machine 1, the position parameters X, Y and the shape parameter F must be supplied to the controller 15, as mentioned above. For example, in order to create a virtually point-like circular drilled hole, the position parameters X, Y consist of the coordinates of the center M of the drilled hole. The coordinates X, Y, which are expressed in the second coordinate system associated with the guidance means 11, theoretically represent the coordinates of the center of drilling M in the coordinate system related to the lens, in other words the third coordinate system $O_3$, $X_3$, $Y_3$.

When the drilling is actually carried out, it will be found that the real center of drilling (or real drilling point) $M_r$ is offset with respect to the theoretical center of drilling (or target drilling point) M, as defined by the coordinates X, Y in the third coordinate system $O_3$, $X_3$, $Y_3$.

This situation is shown in FIG. 3, in which the profile of the lens 21 and its markings defining the coordinate system $O_3$, $X_3$, $Y_3$ are shown in solid lines, and the indexing shape 2A and the associated coordinate system $O_1$, $X_1$, $Y_1$, as positioned with respect to the lens 21 when the latter is placed in the drilling machine 1 on the support 2, are shown in broken lines. The real centre of drilling $M_r$ is also shown on the lens 21 in solid lines, and the theoretical centre of drilling M is shown in broken lines.

For reasons explained below, this offset is expressed by the coordinates dX, dY in one of the three pre-defined coordinate systems, which is assumed to be any one of these coordinate systems.

As a general rule, the offset of the real drilling points with respect to the theoretical drilling points is explained by the fact that the three coordinate systems defined above do not coincide exactly. On the one hand, the second coordinate system, associated with the guidance unit 11 and taken as the reference, for example, of the neutral position of the tool 3, is not exactly locked to the first coordinate system $O_1$, $X_1$, $Y_1$ related to the support 2. This is due to the manufacturing tolerances and to the wear of the mechanical components used in the adjustment of the neutral position of the tool, to the tolerances and wear of the mechanical components of the driver 13, and to the intrinsic inaccuracies of the control elements used in the feedback control of the position of the tool 3, for example. On the other hand, the third coordinate system $O_3$, $X_3$, $Y_3$ related to the lens 21 does not coincide exactly with the first coordinate system $O_1$, $X_1$, $Y_1$ related to the support 2. This is due, in particular, to the inaccuracy, even if very small, of the positioning of the adapter on the lens, and the inaccuracy of the fixing of the adapter to the support 2, resulting, for example, from the manufacturing tolerances of these parts and from the possible deformation of the adapter during the preliminary grinding operation.

It should be noted that the offsets generally found in drilling machines between the theoretical and the real drilling points tend to indicate that there is no significant angular offset between the different coordinate systems. Consequently, in the description of the present invention, it is assumed that these coordinate systems are offset only with respect to translation, and that their horizontal axes, on the one hand, and their vertical axes, on the other hand, are parallel. This has been illustrated in FIG. 3, between the first coordinate system $O_1$, $X_1$, $Y_1$ and the third coordinate system $O_3$, $X_3$, $Y_3$.

For drilling machines used at present, it is therefore necessary, before the first use of the machine, to estimate the offset between the real drilling points and the theoretical drilling points, and to calibrate the machine so as to introduce a correction of the control laws into the controller 15. These calibration operations can be renewed periodically thereafter throughout the service life of the machine.

The correction which is introduced takes the form of a change of variables. For example, the position parameters taken into account for the calculation of the command C are X+dX, Y+dY, in place of the input parameters X, Y.

In the prior art, these calibration methods are implemented on the basis of a "manual" measurement of the offset produced by the uncalibrated machine. In the prior art, an operator uses the uncalibrated machine to drill a succession of virtually point-like circular holes in a template, such as an ophthalmic lens, and measures the positions of these drilled holes on the template by means of a caliper gauge. The operator then deduces the offset of each drilled hole with respect to the theoretical drilling points, and introduces a corresponding correction into the programmable machine guidance means. This correction can, for example, take into account a mean of the offsets found over all the measurement points.

This method has two principal drawbacks, namely the low accuracy of the measurement of the offset (of the order of a 10th of a millimeter), and the considerable time taken for the operation.

SUMMARY OF THE INVENTION

The object of the invention is to propose a calibration method of the type described above, making it possible to obtain a marked increase in accuracy, and requiring a shorter operating time and markedly simpler manipulation operations. This object is achieved by a calibration method according to the invention, in which the following steps are executed in succession. First an image of the previously drilled template is created. the image is analyzed by image analysis unit, so as to measure the offset between the position of the real drilling point and the position of the target point; and the guidance unit is programmed so as to introduce a correction of the command coordinates capable of compensating for the offset.

Other characteristics of this method include the following. The markings defining the third coordinate system comprise markings which define a center and markings which define two orthogonal axes. During the drilling step, the template is drilled at two predetermined points, each corresponding to a target point defined by predetermined command coordinates, so as to obtain two real drilling points. The correction is based on a mean value of the offset of the position of the two real drilling points with respect to the respective two target points.

The invention also proposes a device for implementing a calibration method as described above. This device includes an image capture device; and an image analysis unit connected to the image capture device, adapted to detect the position of the image of a real drilling point of a template, in a coordinate system defined by the image of markings appearing on the template, and to calculate an offset of position of the image with respect to a predetermined target point defined by pre-recorded coordinates. In addition, the device includes a programming unit connected on the one hand to the image analysis unit and on the other hand to the guidance unit for guiding an ophthalmic lens drilling machine. The programming unit is adapted to receive an offset information element from the image analysis unit, and to program the guidance unit of the machine in response, so as to introduce a correction of the command coordinates as a function of the offset information.

According to other characteristics of the device according to the invention, the device additionally comprises a screen and light source for illuminating an ophthalmic object, enabling a shadow of the template to be projected on to the screen. The screen is placed in the field of observation of the image capture device. The device comprises a transparent support to receive the template, positioned between the means of illumination (light source) and the screen. A collimator is positioned between the means of illumination and the transparent support to make the light rays emitted by the means of illumination substantially parallel to each other and normal with respect to the support. The screen is a ground glass; and the image capture device is a video camera.

Finally, the invention proposes equipment for machining ophthalmic lenses, includes a drilling machine which has a drilling tool, an ophthalmic lens support associated with a first coordinate system, and a programmable unit for guiding the tool, associated with a second coordinate system in which command coordinates defining a target drilling point are expressed. In addition, the equipment includes a device as described above, associated with the said drilling machine.

BRIEF DESCRIPTION OF THE DRAWINGS

A specific embodiment of the invention will now be described more fully with reference to the attached drawings, in which.

DETAILED DESCRIPTION OF THE INVENTION

Figure 1:
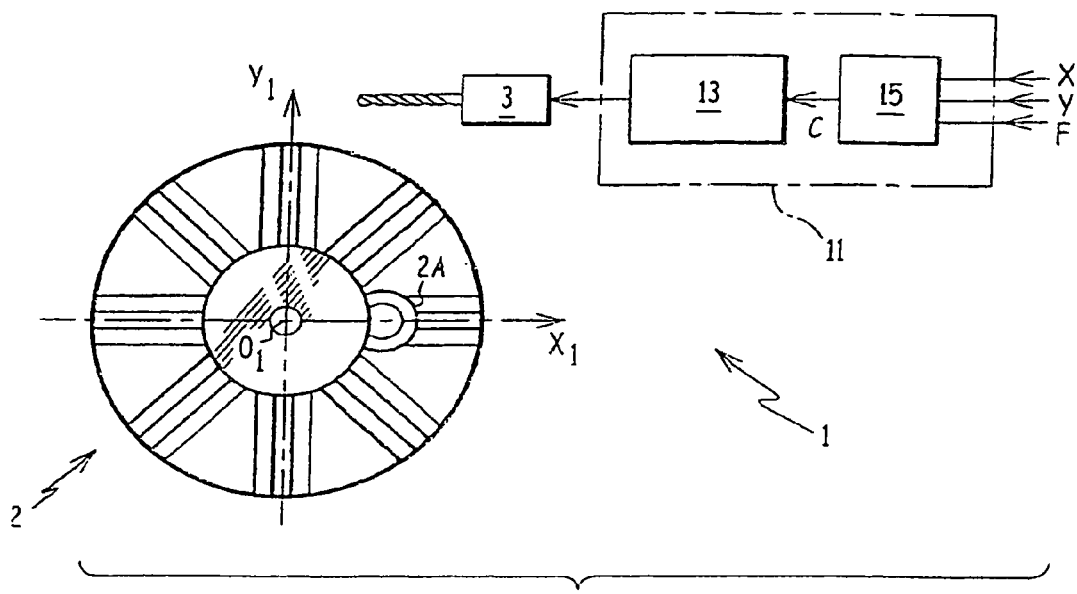
FIGS. 1-3 are schematic diagrams illustrating a conventional ophthalmic lens drilling operation.
Figure 2:
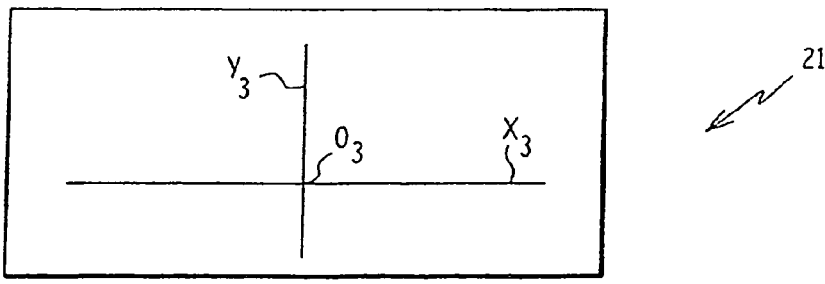
Figure 3:
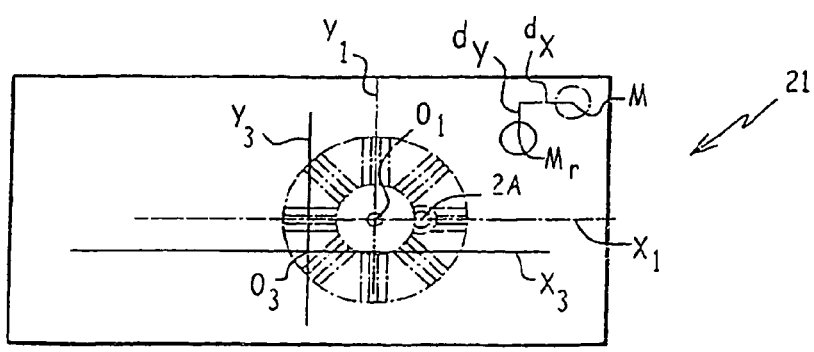

In the calibration method according to the invention, a template is drilled by the uncalibrated machine 1, shown in FIG. 1, as explained previously. In the illustrated example, this template 21 consists of an ophthalmic lens 21, as described with reference to FIG. 2, but could be another ophthalmic object such as a template of plastics or other material, provided with center and axis markings.

The adapter of the template 21 is removed, and the template is then cleaned to remove any trace of adhesive originating from the adapter from the surface of the template, and to leave the markings associated with the coordinate system $O_3$, $X_3$, $Y_3$ visible on the surface of the template.

Figure 4:
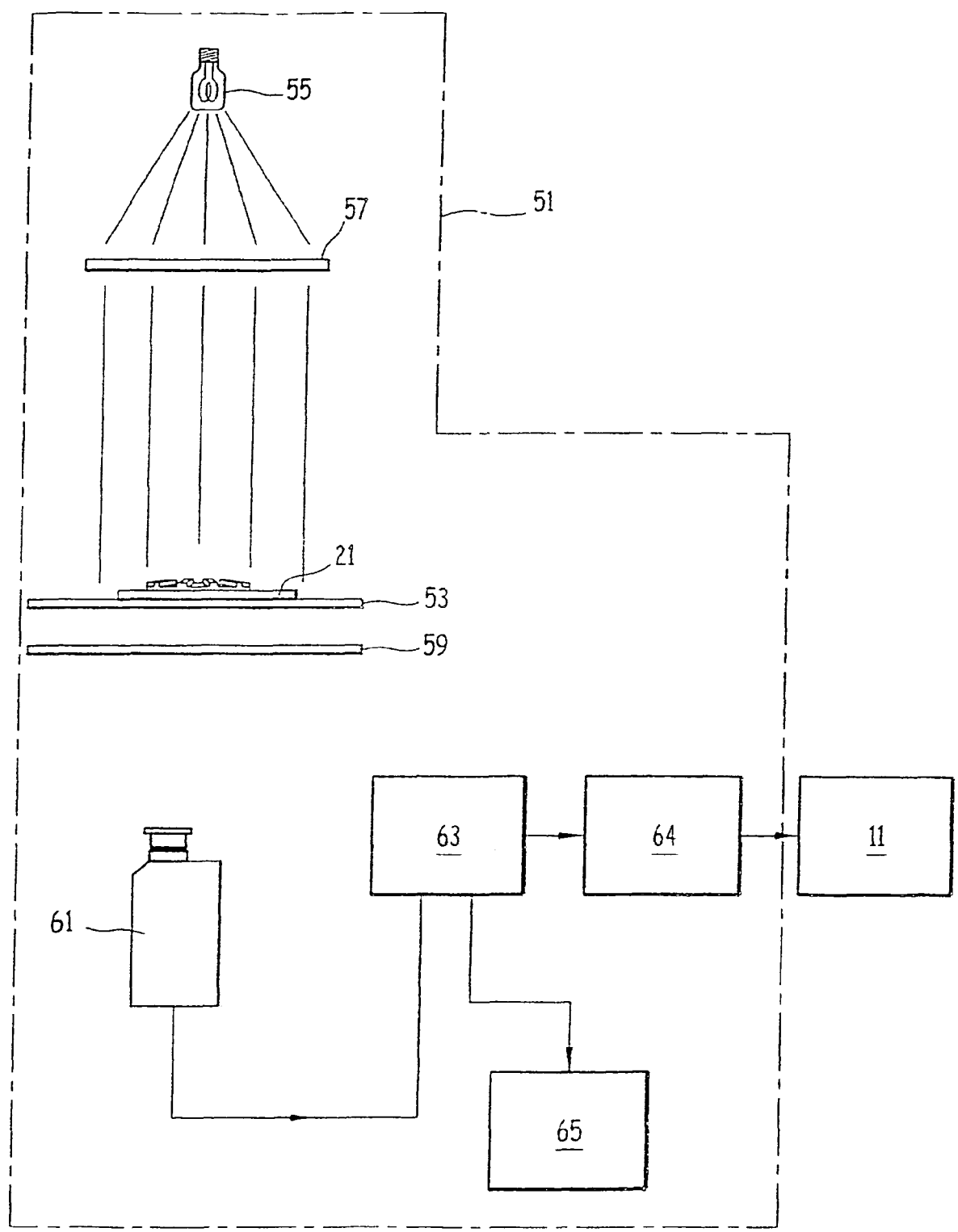
FIG. 4 is a schematic view of a device according to the invention.

The coordinates dX, dY of the offset between the real drilling points $M_r$ and theoretical drilling points M are then estimated by drilling calibration device 51 shown in FIG. 4.

This drilling calibration device 51 comprises a flat transparent support 53 on which can be placed the drilled template (ophthalmic lens) 21, which has previously been separated from its adapter.

It also comprises a light source 55, a collimator 57, and a ground glass 59, positioned in such a way that the light rays emitted by the source 55 pass through the collimator 57 to be made parallel and orthogonally illuminate the template 21 placed on the support 53. This arrangement enables the drilled template and its markings $O_3$, $X_3$, $Y_3$ to be projected on to the ground glass 59.

The device additionally comprises an image capture device in the form of a video camera 61, image analysis unit 63 connected to the camera 61, and if necessary a display screen 65 connected to the image analysis unit 63. The screen 65 could also be connected directly to the camera 61.

The ground glass 59, forming a screen for the projection of the shadow of the object placed on the support 53, is placed in the field of the camera 61, in such a way that the camera 61 observes this projected shadow and transmits its image to the image analysis unit 63.

The device also comprises programming unit 64 connected, on the one hand, to the image analysis unit 63, and, on the other hand, to the guidance unit 11 for guiding the drilling machine 1.

Figure 5:
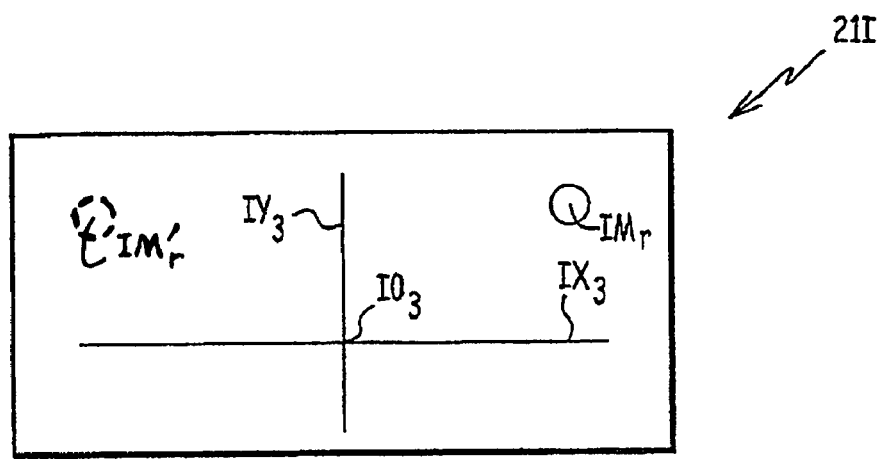
FIG. 5 is a partial view of the image of a template, as it may be observed by the image capture device of the device according to the invention.

FIG. 5 shows the image 21I of the template 21 which is thus observed by the camera 61, as it appears on the screen 65.

The shadow of the drilled hole $IM_r$, and the shadows of the center marking $IO_3$ and of the axis markings $IX_3$, $IY_3$ appear distinctly in this image 21I.

The image analysis unit 63 is adapted to detect the image $IM_r$ of the drilled hole formed in the template 21, and the image of the markings $IO_3$, $IX_3$, $IY_3$, calculate the position of the drilling point $IM_r$ in this image coordinate system $IO_3$, $IX_3$, $IY_3$, and calculate in this coordinate system the coordinates of the offset dX, dY between the point $M_r$ and the point M, which are assumed to be equal to the difference between the coordinates of the point $IM_r$ in the coordinate system $IO_3$, $IX_3$, $IY_3$, on the one hand, and those of the point M in the second coordinate system.

The value of the offset dX, dY estimated in this way is transmitted to the programming unit 64.

If necessary, the offset can be measured for two or more distinct drilling points, rather than for a single point as described above. In the case of two distinct drilling points, the image 21I of the template 21 will then have a second image IM; corresponding to the second drilled hole in FIG. 5. The correction of the control laws can then be based on a mean of the offsets estimated in this way.

Thus the drilling calibration device 51 makes it possible to produce a precise estimate of the offset of a real drilling point with respect to a target point, and, because of its programming unit 64, automatically program the guidance unit 15 of the ophthalmic lens drilling machine so as to introduce a correction of the command laws dependent on the estimated offset coordinates dX, dY. The accuracy achieved by such a device and such a calibration method is of the order of a hundredth of a millimeter.

It should be noted that the drilling machine 1 and the associated device which have been described can be incorporated into ophthalmic lens machining equipment which also comprises a grinder. Thus it is possible to use a single piece of equipment to grind an ophthalmic lens, starting with a lens blank, and to drill the lens thus produced, by using the grinding adapter fixed on the lens to immobilize the lens on the drilling support.

The device described above can be used for calibrating not only the drilling machine, but also the grinder.

The invention claimed is:

1. A method of calibrating an ophthalmic lens drilling machine, the drilling machine including a drilling tool, an ophthalmic lens support associated with a first coordinate system, and a programmable guidance unit for guiding the tool, the programmable guidance unit being associated with a second coordinate system expressing command coordinates which define a target drilling point; said method comprising:

placing a template on the lens support, the template having pre-applied markings defining a third coordinate system related to the template, said placing being conducted such that the third coordinate system substantially coincides with the first coordinate system;

drilling the template in at least one pre-determined point corresponding to the target drilling point defined by predetermined command coordinates so as to create a drilled template, said drilling being performed such that a real drilling point is obtained;

creating an image of the drilled template;

analyzing the created image using an image analysis unit to measure an offset between the position of the real drilling point and the position of the target drilling point; and introducing a correction of the command coordinates using the guidance unit so as to introduce a correction of the command coordinates capable of compensating for the offset;

wherein said drilling comprises drilling the template at two predetermined points, each predetermined point corresponding to a target point defined by predetermined command coordinates, so as to obtain two real drilling points, said introducing a correction comprising determining a correction based on a mean value of the offsets of the positions of the two real drilling points with respect to the respective two target points.

2. The method of claim 1, wherein the markings defining the third coordinate system comprise markings which define a centre and markings which define two orthogonal axes.

3. A drilling calibration device for calibrating an ophthalmic lens drilling machine by a method in which a template is placed on a lens support, the template having pre-applied markings; the template being drilled in at least one pre-determined point corresponding to the target drilling point defined by predetermined command coordinates so as to create a drilled template, the drilling being performed such that a real drilling point is obtained; an image of the drilled template being created; the created image being analyzed to measure an offset between the position of the real drilling point and the position of the target drilling point; and a correction of the command coordinates being introduced using a guidance unit so as to introduce a correction of the command coordinates capable of compensating for the offset, said drilling calibration device comprising:

an image capture device to create the image of the drilled template;

an image analysis unit connected to said image capture device, said image analysis unit being operable to detect a position of the image of the real drilling point of the template, in a coordinate system defined by the markings appearing on the template, and to calculate the offset of the position of the image with respect to the target drilling point defined by the predetermined command coordinates and produce an offset information element; and a programming unit connected to said image analysis unit and to a guidance unit for guiding an ophthalmic lens drilling machine, said programming unit being operable to receive the offset information element from said image analysis unit, and to program the guidance unit of the drilling machine based on the offset information element so as to introduce a correction of the command coordinates as a function of the offset information element;

wherein said programming unit is further operable to determine a correction based on a mean value of offsets of positions of two real drilling points with respect to two respective target points, the template being drilled at two predetermined points, each predetermined point corresponding to a respective one of the two target points defined by predetermined command coordinates so as to obtain the two real drilling points.

4. The device of claim 3, further comprising a screen and an illumination device for illuminating an ophthalmic object so as to enable a shadow of the template to be projected on to the screen, said screen being placed in a field of observation of said image capture device.

5. The device of claim 4, further comprising a transparent support to receive and support the template, said transparent support being positioned between illumination device and said screen.

6. The device of claim 5, further comprising a collimator positioned between said illumination device and said transparent support to make light rays emitted by said illumination device substantially parallel to each other and normal with respect to said transparent support.

7. The device of claim 4, wherein said screen is a ground glass.

8. The device of claim 3, wherein said image capture device is a video camera.

9. A drilling system for machining ophthalmic lenses, comprising:
   a drilling machine including:
      a drilling tool;
      an ophthalmic lens support associated with a first coordinate system; and
      a programmable guidance unit for guiding said drilling tool, said guidance unit being associated with a second coordinate system expressing command coordinates which define a target drilling point; and
   a drilling calibration device including:
      an image capture device to create an image of a drilled template having pre-applied markings defining a third coordinate system and having a real drilling point, the third coordinate system substantially coinciding with the first coordinate system;
      an image analysis unit connected to said image capture device, said image analysis unit being operable to detect a position of the image of the real drilling point of the template in the third coordinate system defined by the markings appearing on the template, and to calculate the offset of the position of the image with respect to the target drilling point defined by the predetermined command coordinates and produce an offset information element; and
      a programming unit connected to said image analysis unit and to a guidance unit for guiding an ophthalmic lens drilling machine, said programming unit being operable to receive the offset information element from said image analysis unit, and to program said guidance unit of said drilling machine based on the offset information element so as to introduce a correction of the command coordinates as a function of the offset information element;
      wherein said programming unit is further operable to determine a correction based on a mean value of offsets of positions of two real drilling points with respect to two respective target points, the template being drilled at two predetermined points, each predetermined point corresponding to a respective one of the two target points defined by predetermined command coordinates, so as to obtain the two real drilling points.

* * * * *